US012621248B2

(12) United States Patent
Meo et al.

(10) Patent No.: US 12,621,248 B2
(45) Date of Patent: May 5, 2026

(54) END-TO-END PATH TRACING OF HYBRID UNICAST AND MULTICAST TRANSLATED FLOWS

(71) Applicant: Cisco Technology, Inc., San Jose, CA (US)

(72) Inventors: Francesco Meo, San Jose, CA (US); Sachin V Vishwarupe, Santa Clara, CA (US); Lakshmi Ramesh, San Jose, CA (US); Roshan Lal, Gilroy, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 355 days.

(21) Appl. No.: 18/315,850

(22) Filed: May 11, 2023

(65) Prior Publication Data

US 2024/0380706 A1     Nov. 14, 2024

(51) Int. Cl.
 *H04L 47/41* (2022.01)
 *H04L 47/10* (2022.01)
 *H04L 61/45* (2022.01)

(52) U.S. Cl.
 CPC .............. *H04L 47/41* (2013.01); *H04L 47/18* (2013.01); *H04L 61/45* (2022.05)

(58) Field of Classification Search
 None
 See application file for complete search history.

(56) References Cited

U.S. PATENT DOCUMENTS

| | | | |
|---|---|---|---|
| 7,334,049 B1 * | 2/2008 | Somasundaram | ...... H04L 69/22 709/227 |
| 2006/0221962 A1 * | 10/2006 | Previdi | .............. H04L 12/1836 370/432 |
| 2012/0250685 A1 | 10/2012 | Bisdikian | |
| 2013/0279352 A1 * | 10/2013 | Golan | ................ H04L 41/0803 370/252 |
| 2016/0057116 A1 * | 2/2016 | Charan | .............. H04L 63/0471 713/153 |
| 2016/0269324 A1 * | 9/2016 | Banavalikar | ........... H10D 62/40 |
| 2017/0099156 A1 | 4/2017 | Qiu et al. | |
| 2018/0006930 A1 * | 1/2018 | Du | ......................... H04L 67/56 |
| 2018/0062930 A1 | 3/2018 | Dhesikan et al. | |
| 2018/0077060 A1 | 3/2018 | Nagarajan et al. | |
| 2018/0191471 A1 * | 7/2018 | Elhaddad | ................. H04L 1/24 |
| 2019/0238364 A1 * | 8/2019 | Boutros | ............. H04L 12/4633 |

(Continued)

*Primary Examiner* — Yaotang Wang
(74) *Attorney, Agent, or Firm* — Edell, Shapiro & Finnan, LLC

(57) ABSTRACT

Methods are provided for visualizing end-to-end path traversed by a hybrid media traffic flow. Specifically, the methods involve obtaining at least one hybrid flow record that includes information about a source of a traffic flow prior to performing a network address translation for the traffic flow. The traffic flow traverses from the source, along a path in a network, to a destination. The method further involves generating a merged flow data record in which at least two flow data records are merged based on the at least one hybrid flow record. The at least two flow data records include a unicast flow data record and a multicast flow data record based on the traffic flow traversing along the path in the network. The method further includes providing an end-to-end visibility of the path traversed by the traffic flow based on the merged flow data record.

20 Claims, 11 Drawing Sheets

(56) References Cited

U.S. PATENT DOCUMENTS

| | | | |
|---|---|---|---|
| 2021/0058366 A1* | 2/2021 | Mas Rosique | H04L 67/51 |
| 2021/0075630 A1* | 3/2021 | Immidi | H04L 45/16 |
| 2022/0014451 A1* | 1/2022 | Naik | H04L 45/02 |

* cited by examiner

| Link Details 420 | |
|---|---|
| STARTING NODE | DESTINATION NODE |
| Ethernet1/1 | Vlan21 |
| Ethernet1/1/3 | Ethernet1/1/2 |
| Ethernet1/49 | Ethernet1/1 |

| NAT 432a | Pre-Source 432b | Post-Source 432c | Pre-Group/Dest 432d | Post-Group/Dest 432e | Post S Port 432f | Post DST Port 432g | Pre-NAT Policy ID 432h | Post-NAT Policy ID 432i |
|---|---|---|---|---|---|---|---|---|
| UMNAT | 50.37.1.2 | 155.101.1.1 | 22.9.1.28 | 229.1.1.28 | 0 | 0 | N/A | Default |

Flow Information 430

Show IP Route     510

(172.22.198.10) —— 414b

Command: show ip route 50.37.1.2 vrf nbm_vrf_active

IP Route Table for VRF "nbm_vrf_active"

'*' denotes best ucast next-hop

'**' denotes best mcast next-hop

'[x/y]' denotes [preference/metric]

'%<string>' in via output denotes VRF <string>

50.37.1.2/32, ubest/mbest: 1/0, attached

*via 50.37.1.2, Eth1/43, [250/0], 7w6d, am

520

500

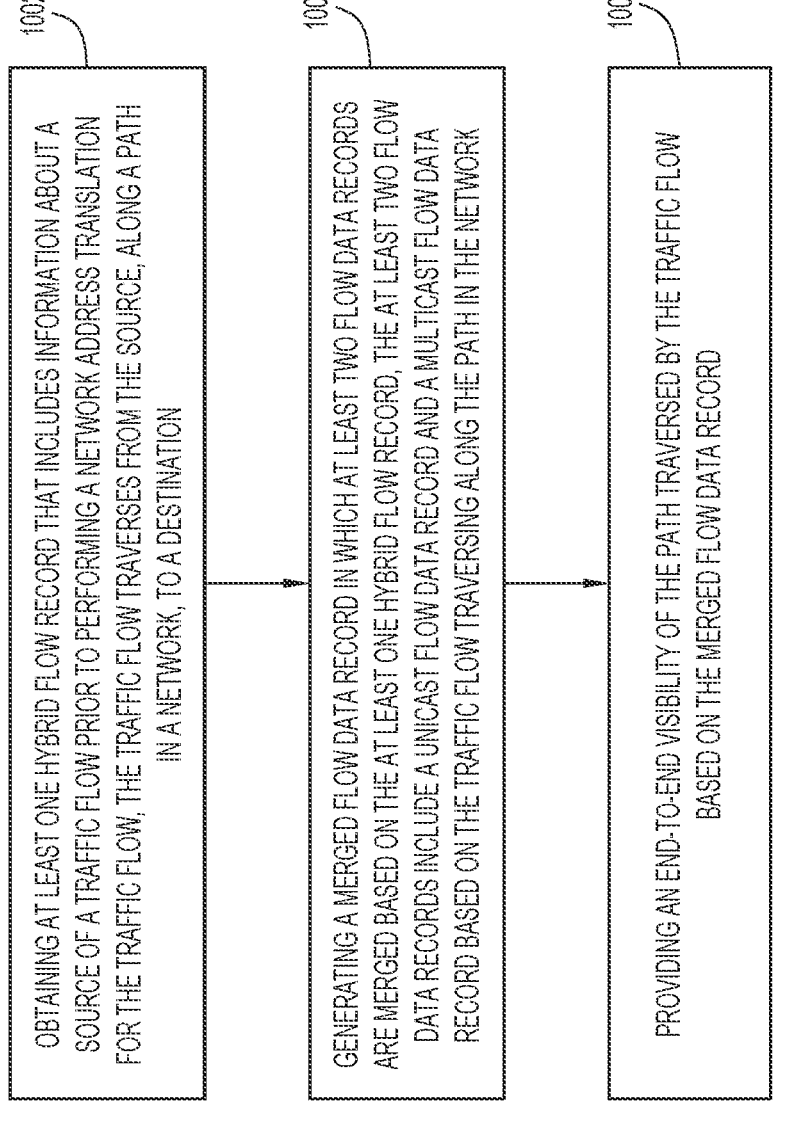

1002

OBTAINING AT LEAST ONE HYBRID FLOW RECORD THAT INCLUDES INFORMATION ABOUT A SOURCE OF A TRAFFIC FLOW PRIOR TO PERFORMING A NETWORK ADDRESS TRANSLATION FOR THE TRAFFIC FLOW, THE TRAFFIC FLOW TRAVERSES FROM THE SOURCE, ALONG A PATH IN A NETWORK, TO A DESTINATION

1004

GENERATING A MERGED FLOW DATA RECORD IN WHICH AT LEAST TWO FLOW DATA RECORDS ARE MERGED BASED ON THE AT LEAST ONE HYBRID FLOW RECORD, THE AT LEAST TWO FLOW DATA RECORDS INCLUDE A UNICAST FLOW DATA RECORD AND A MULTICAST FLOW DATA RECORD BASED ON THE TRAFFIC FLOW TRAVERSING ALONG THE PATH IN THE NETWORK

1006

PROVIDING AN END-TO-END VISIBILITY OF THE PATH TRAVERSED BY THE TRAFFIC FLOW BASED ON THE MERGED FLOW DATA RECORD

END-TO-END PATH TRACING OF HYBRID UNICAST AND MULTICAST TRANSLATED FLOWS

TECHNICAL FIELD

The present disclosure generally relates to computer networks and systems.

BACKGROUND

Internet Protocol (IP) fabric for media (IPFM) helps media industry migrate from a serial digital interface (SDI) route to an IP-based infrastructure. In addition to physical media endpoints (EPs), services are extending beyond on-premise networking. Cloud computing is used in pre-processing and/or post-processing media data (e.g., audio and/or video data), media encoding, etc. Cloud networking is also involved in multi-site connections. Even though IP media solutions are based on multicast traffic flows, end to end multicast through the cloud (or cloud platforms) is not practical. Often, the media data is translated to unicast data while traversing through the cloud.

BRIEF DESCRIPTION OF THE DRAWINGS

FIG. 10 is a flowchart illustrating a method of providing end-to-end visibility of a path traversed by a traffic flow that was network address translated between unicast and multicast, according to an example embodiment.

DETAILED DESCRIPTION

Overview

Figure 1:
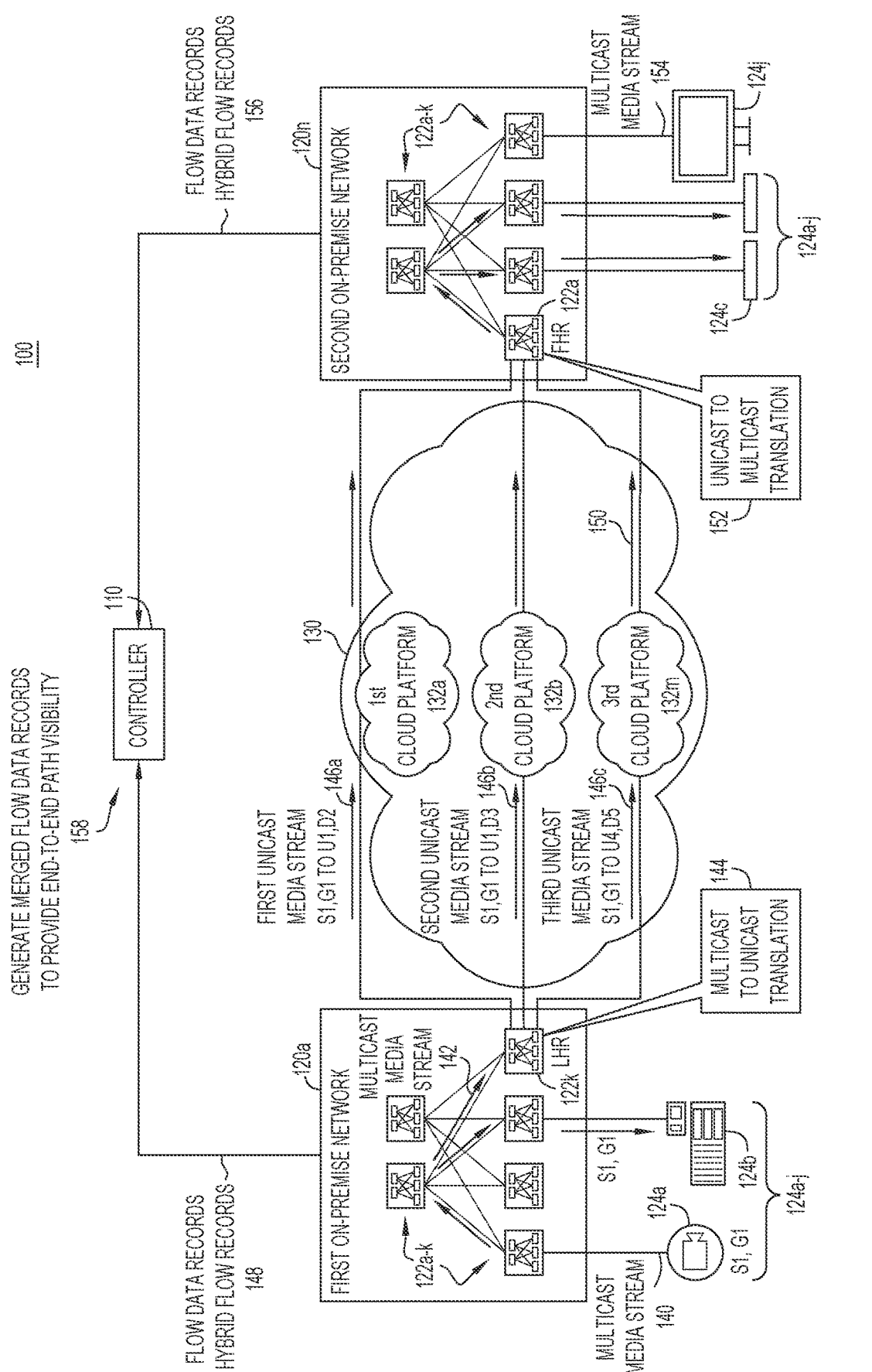
FIG. 1 is a diagram illustrating a system in which an end-to-end path traversed by a hybrid traffic flow is traced or tracked, according to an example embodiment.

Techniques presented herein provide end-to-end path tracing or tracking for network address translated (NATed) or hybrid flows in an IP fabric. The hybrid flows are translated between unicast and multicast.

In one form, a method presented herein involves obtaining at least one hybrid flow record that includes information about a source of a traffic flow prior to performing a network address translation for the traffic flow. The traffic flow traverses from the source, along a path in a network, to a destination. The method further involves generating a merged flow data record in which at least two flow data records are merged based on the at least one hybrid flow record. The at least two flow data records include a unicast flow data record and a multicast flow data record based on the traffic flow traversing along the path in the network. The method further involves providing an end-to-end visibility of the path traversed by the traffic flow based on the merged flow data record.

Example Embodiments

Network management platforms deploy services for monitoring and visualizing traffic flows traversing in a network, for managing sender/receiver endpoints and network devices, and deploying flow control policies for the network. In addition to physical media endpoints (EPs), the services are extending beyond on-premise networking. The services use cloud computing for media data processing and cloud networking for media data transport. Since transporting end-to-end multicast data through a cloud platform is not practical, multicast to unicast and unicast to multicast network address translation (NAT) features are used.

The monitoring services may provide path traceability for native multicast networks. When the media traffic flow is network address translated (NATed) one or more times along a path in the network from a source to a destination i.e., when traffic flows are translated or converted between multicast and unicast, information is lost and path tracing becomes challenging. A single unicast (or multicast) flow may also transform into multiple multicast (or unicast) flows. As source, destination to which the sender EP is streaming is different than receiver subscription, end-to-end path tracing is at the very least challenging. Additionally, these flows typically span across multiple network devices (e.g., switches) further complicating end-to-end path tracing.

The techniques provided herein correlate flow records from a first hop router (FHR) to a last hop router (LHR) and intermediate nodes along the path of the traffic flow to handle Internet Protocol (IP) address and port translation performed by the edge network nodes, and to provide visibility of the end-to-end path. Based on the end-to-end path visibility, debugging and troubleshooting is simplified.

In this disclosure, traffic flow, data flow, media traffic flow, network flow, or packet flow may be used interchangeably. Further, a hybrid traffic flow means that the traffic flow was translated between multicast and unicast at least once along the path being traversed from a source to a destination.

FIG. 1 is a block diagram illustrating a system 100 in which an end-to-end path traversed by a hybrid traffic flow is traced or tracked, according to an example embodiment. The system 100 includes a controller 110, a plurality of on-premise networks 120*a-n*, and a cloud network 130. This is just one example and the system 100 may include other entities or nodes depending on a particular deployment and/or use case scenario.

The notations 1, 2, 3, . . . n; a, b, c . . . n; "a-n", "a-m", "a-f", "a-g", "a-k", "a-c", and the like illustrate that the number of elements can vary depending on a particular implementation and is not limited to the number of elements being depicted or described. Moreover, this is only an example of various components, and the number and types of components, functions, etc. may vary based on a particular deployment and use case scenario.

The controller 110 may be a network controller that analyzes telemetry data obtained from various entities in the system 100. The controller 110 determines and extracts relevant information from various traffic flow data records and generates merged flow data records to provide visibility to end-to-end paths traversed by various traffic flows. The controller 110 further monitors these traffic flows and perform various actions with respect to these traffic flows such as traffic categorization, end-to-end paths visualization, troubleshooting of the traffic flows, and/or debugging. The controller 110 is just one example of a network management service.

The network management services may be distributed among a plurality of devices. Moreover, the controller 110 may receive flow data via another entity such as one or more telemetry collectors (not shown). In one example embodiment, the controller 110 is a network analysis entity or a software application that stores and analyzes telemetry data, to determine and visualize end-end path tracing, categorize traffic flows, and perform remediation or configuration actions. That is, the controller 110 may configure or change configuration of one or more entities in the system 100 based on the end-to-end path tracing.

In one or more example embodiments, the controller 110 generates the merged flow data records that link at least two flow data records such as a unicast flow data record and a multicast flow data record. Based on the foregoing, the controller 110 provides end-to-end path visibility for a hybrid traffic flow i.e., a traffic flow that was NATed. The controller 110 further manages hybrid traffic flows that were switched between unicast and multicast in multiple fabrics.

The plurality of on-premise networks 120*a-n* include a first on-premise network 120*a* and a second on-premise network 120*n*. The plurality of on-premise networks 120*a-n* may be enterprise networks or network domains at particular locations. In one example embodiment, the plurality of on-premise networks 120*a-n* include enterprise sites or physical locations such as one or more data centers, facilities, or buildings located across geographic areas that designated to host the network/computing equipment and software 122*a-k*. Each of the plurality of on-premise networks 120*a-n* may include various network/computing equipment and software 122*a-k* i.e., resources or assets and/or various endpoints 124*a-j*.

The network/computing equipment and software 122*a-k* may include any type of network devices or network nodes such as controllers, access points, gateways, switches, routers, hubs, bridges, gateways, modems, firewalls, intrusion protection devices/software, repeaters, servers, and so on. In one or more example embodiments, the network devices are transport nodes, e.g., a first hop router 122*a*, a last hop router 122*k*, and various intermediate network devices (transit nodes). The network devices may include, but are not limited to switches, virtual routers, leaf nodes, spine nodes, etc. The network devices include a central processing unit (CPU), a memory, a packet processing logic, an ingress interface, an egress interface, one or more buffers for storing various packets of various traffic flows, and one or more interface queues.

The first hop router 122*a* and the last hop router 122*k* are edge network devices (such as an ingress switch and an egress switch, respectively) that perform network address translation (NAT) between a respective on-premise network (multicast) and a respective cloud network (unicast), as detailed below. The first hop router 122*a* and the last hop router 122*k* (edge network nodes) may further transport traffic flow to an on-premise processing device such as an encoder or a decoder i.e., to encode media data for transport in the cloud network 130 or to decode media data for output on one or more of the endpoints 124*a-j*. The network/computing equipment and software 122*a-k* transport data (traffic flows or media streams) from a source to a destination (i.e., the endpoints 124*a-j*) and generate telemetry data including flow data records that are provided to the controller 110 for flow monitoring, etc.

The endpoints 124*a-j* are user devices such as personal computers, laptops, tablets, and so on. The endpoints 124*a-j* include a data source device 124*a* and a data sink device 124*j*. The data source device 124*a* may be a camera or the like that generates media data such as video or audio. The data sink device 124*j* may be a computer, a smart phone, or the like that outputs the media data. The endpoints 124*a-j* may be data processing devices such as an encoder 124*b* and a decoder 124*c*.

When a traffic flow traverses in an on-premise network, the traffic flow is a multicast media stream. When the traffic flow needs to be transported in the cloud network 130, it needs to be translated or transformed into a unicast media stream. The cloud network 130 or the cloud may include various cloud platforms such as first cloud platform 132*a*, a second cloud platform 132*b*, and a third cloud platform 132*m*, each of which provides network capabilities and/or resources. These various cloud platforms may be managed by different service providers. For example, cloud platforms may be one or more virtual data centers, which are a pool or a collection of cloud-based infrastructure resources specifically designed for enterprise needs, and/or for cloud-based service provider needs.

In various example embodiments, the entities of the system 100 (the plurality of network/computing equipment and software 122*a-k*, endpoints 124*a-j*, and the controller 110) may each include a network interface, at least one processor, and a memory. Each entity may be any programmable electronic device capable of executing computer readable program instructions. The network interface may include one or more network interface cards (having one or more ports) that enable components of the entity to send and receive data over the network(s). Each entity may include internal and external hardware components such as those depicted and described in further detail in FIG. 11. In one example, at least some of these entities may be embodied as virtual devices with functionality distributed over a number of hardware devices such as virtual switches, routers, etc.

In the system 100, the data source device 124*a* may generate media data. At 140, the data source device 124*a* provides the media data to the first on-premise network 120*a* in a form of a media stream. The media stream is transported in a plurality of packets i.e., traffic flow and includes identifying information such as a source identifier (S1) and a group identifier (G1). The traffic flow is a multicast traffic flow directed to several endpoints (group G1) in the second on-premise network 120*n*. The traffic flow needs to traverse through the cloud network 130 to reach the second on-premise network 120*n*.

The traffic flow traverses through the first on-premise network 120*a* as multicast and at 142, is received by the last hop router 122*k*. At 144, the last hop router 122*k* performs a network address translation for transporting the media stream in the cloud network 130. Specifically, the last hop router 122*k* transforms the multicast media stream to several unicast media streams. The last hop router 122*k* also generates one or more hybrid flow records that include information about the source (data source device 124*a*) of the traffic flow prior to performing the network address translation. For example, the hybrid flow records include S1, G1 in addition to the destination information such as a user identifier (U #) and a device identifier (D #).

At 146*a*, the last hop router 122*k* sends a first unicast media stream that includes information S1, G1, U1, D2 to the first cloud platform 132*a*. At 146*b*, the last hop router 122*k* also sends a second unicast media stream that includes information S1, G1, U1, D3 to the second cloud platform 132*b*, and at 146*c*, the last hop router 122*k* also sends a third unicast media stream that includes information S1, G1, U4, D5 to the third cloud platform 132*m*.

At 148, network devices (e.g., switches) of the first on-premise network 120*a* report flow data records via telemetry to the controller 110. The last hop router 122*k* reports the hybrid flow records that includes a pointing to pre-NAT information (S1, G1). That is, the hybrid flow records include information about the source of the traffic flow prior to performing the network address translation.

At 150, the first hop router 122*a* of the second on-premise network 120*n* receives each of the first unicast media stream from the first cloud platform 132*a*, the second unicast media stream from the second cloud platform 132*b*, and the third unicast media stream from the third cloud platform 132*m*.

At 152, first hop router 122*a* performs a network address translation to multicast but models an additional unicast object that provides a pointer to information about the unicast traffic flow. That is, the first hop router 122*a* generates a hybrid flow record that includes pre-NATed source and pre-NATed destination. The hybrid flow record includes information about the NATed flow such as source, group in the second on-premise network 120*n*, etc. but also includes information about the source and destination of the traffic flow prior to performing the network address translation.

The multicast media streams then traverse in the second on-premise network 120*n* and at 154, the multicast media stream is received by the data sink device 124*j* e.g., to be displayed on a user monitor. The multicast media stream are also provided to other devices from the endpoints 124*a*-*j*.

At 156, the network devices of the second on-premise network 120*n* (e.g., switches) report flow data records via telemetry to the controller 110. The first hop router 122*a* reports the hybrid flow records that includes a pointer to pre-NATed information (source and destination of unicast traffic flow). That is, the hybrid flow records include information about the source of the traffic flow prior to performing the network address translation.

At 158, the controller 110 generates merged flow data records based on the flow records and the hybrid flow records that provide a link between multicast flow records and unicast flow records and provides an end-to-end visibility of the path traversed by the traffic flow using the merged flow data records. That is, the controller 110 provides a path traversed by the traffic flow including a first portion of the path traversed in the first on-premise network

120*a*, a second portion of the path traversed in the cloud network 130, and a third portion of the path traversed in the second on-premise network 120*n*. The path includes information about the source, intermediate nodes (network devices) and connections/links, and the destination.

Figure 2:
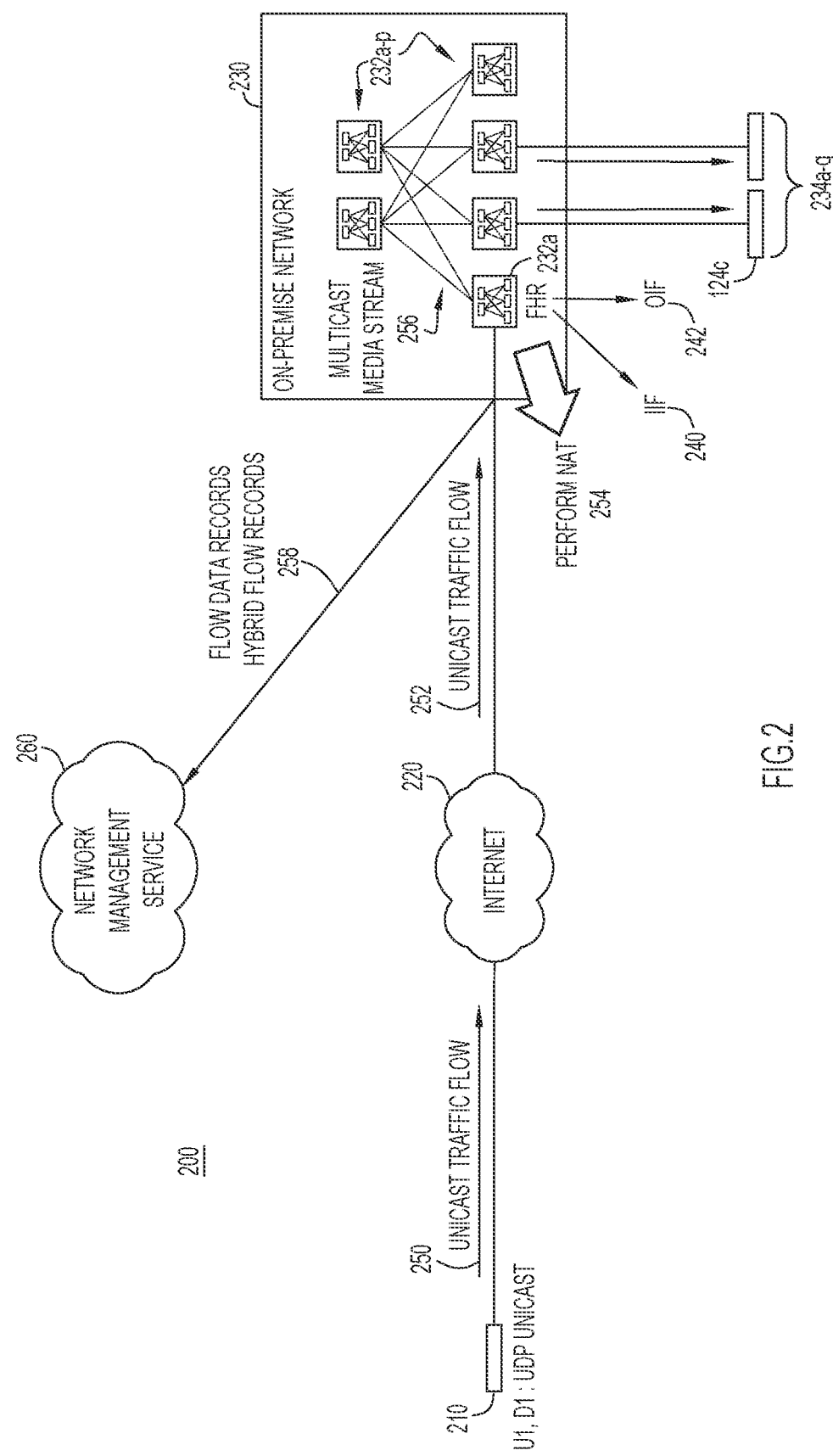
FIG. 2 is a diagram illustrating a system in which a hybrid flow record is generated for a traffic flow that is translated from unicast to multicast, according to an example embodiment.

FIG. 2 is a diagram illustrating a system 200 in which a hybrid flow record is generated for a traffic flow that is translated from unicast to multicast, according to an example embodiment. The system 200 includes a unicast source device 210, a network 220, an on-premise network 230, and a network management service 260. The unicast source device 210 may be one of the cloud platforms in the cloud network 130 of FIG. 1. The network 220 may be Internet. The on-premise network 230 may be the second on-premise network 120*n* of FIG. 1. The network management service 260 may be the controller 110 of FIG. 1.

The on-premise network 230 includes a plurality of network devices 232*a*-*p* such as switches (spine, leaf, etc.), routers, etc. The plurality of network devices 232*a*-*p* includes an edge device i.e., the first hop router 232*a*, that performs network address translation from unicast to multicast. The on-premise network 230 further includes a plurality of endpoints 234*a*-*q* such as decoders, receivers, user devices, etc. On the network devices 232*a*-*p*, flow is realized as incoming interface (IIF) and a collection of outgoing interfaces (OIFs). For example, the first hop router 232*a* includes an incoming interface (IIF 240) and an outgoing interface (OIF 242).

In the system 200, at 250, the unicast source device 210 (e.g., a head-end device) sends a unicast traffic flow (e.g., a media stream) via the network 220. The unicast source device 210 uses IP delivery method such as Transmission Control Protocol (TCP) and User Datagram Protocol (UDP) to provide the traffic flow to the on-premise network 230 (one to one transmission). The unicast traffic flow has information about the source and destination (U1,D1).

At 252, the unicast traffic flow is received by the first hop router 232*a*. The first hop router 232*a* extracts from a unicast data record associated with the unicast traffic flow, unicast information about the source (S1) and the destination (D1).

At 254, the first hop router 232*a* translates the unicast traffic flow into multicast traffic flow and at 256, the first hop router 232*a* then streams the multicast traffic flow into the fabric i.e., sends to other network devices in the on-premise network 230 (multiple network devices). Except for the first hop router 232*a*, the other network devices in the on-premise network 230 are unaware of the fact that incoming traffic flow was unicast. As such, the first hop router 232*a* models additional unicast object and provides a pointer to it on OIF object of post-NATed flow to link the unicast stream to the multicast streams. Specifically, the first hop router 232*a* generates a hybrid flow record for OIF 242 that includes the extracted source and destination (S1, D1) of the pre-NATed flow.

At 258, the first hop router 232*a* provides the hybrid flow record (e.g., record for the OIF 242) and other data records (e.g., record for the IIF 240) to the network management service 260. The network management service 260 generates a merged flow record that provides information for end-to-end visibility of the path traversed by the traffic flow including a first portion of the path that was traversed in the cloud and a second portion of the path that was traversed in the on-premise network 230. In other words, the end-to-end path visibility includes network devices traversed in the cloud (unicast) and in the on-premise network 230 (multicast).

Figure 3:
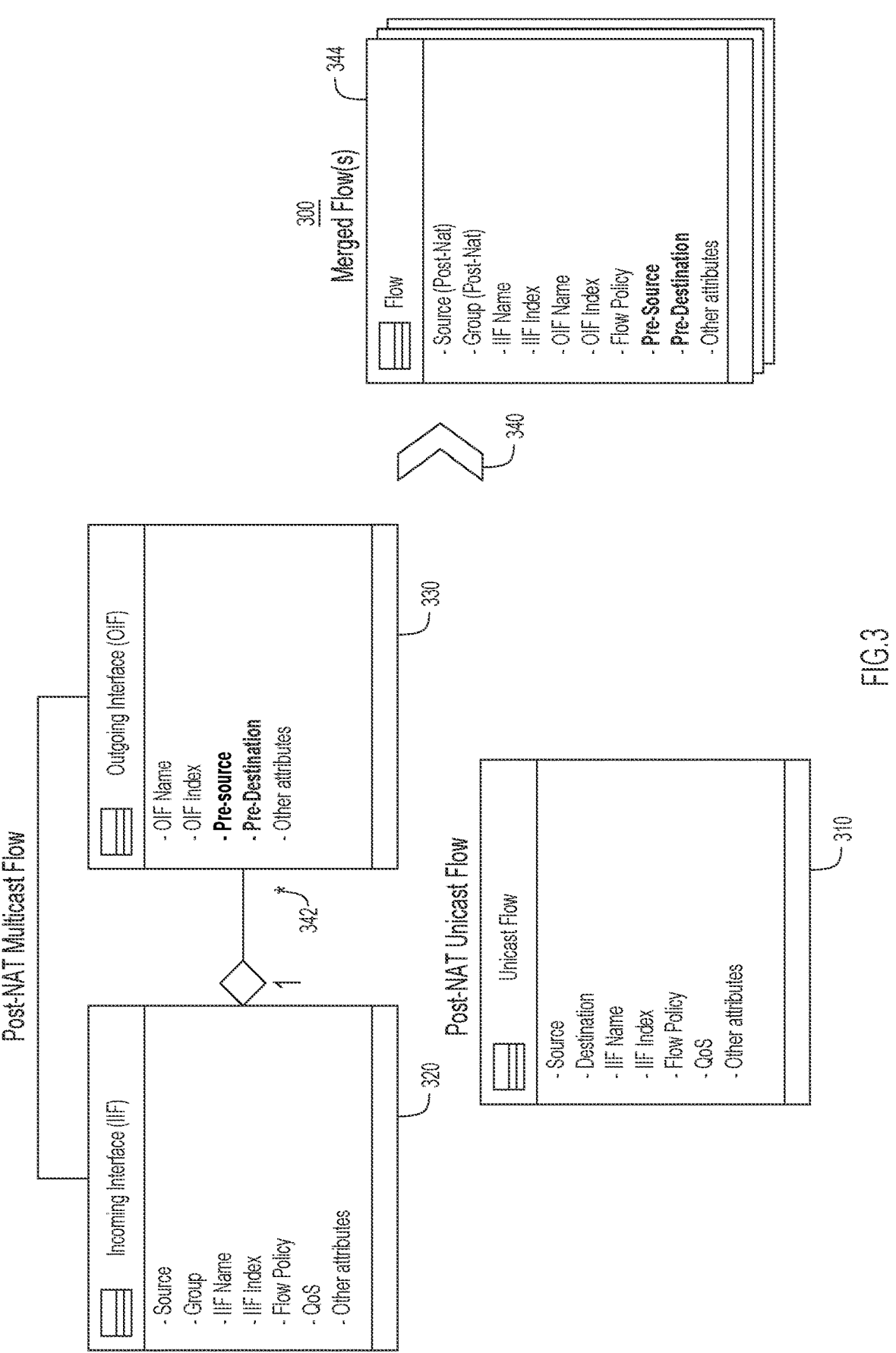
FIG. 3 is a diagram illustrating a merged flow data record for a traffic flow that is translated from unicast to multicast, according to an example embodiment.

With continued reference to FIG. 2, FIG. 3 is a diagram illustrating a merged flow data record 300 for a traffic flow that is translated from unicast to multicast, according to an example embodiment. The merged flow data record 300 is based on at least two flow data records such as one of a first unicast flow data record 310 and a second multicast flow data record 320 for an incoming interface (IIF 240) and a hybrid flow record 330 for an outgoing interface (OIF 242).

The first unicast flow data record 310 is associated with a unicast traffic flow and includes information such as source and destination (U1, D1), a name of the IIF 240, an index of the IIF 240, flow policy, quality of service (QOS), and other attributes. The second multicast flow data record 320 includes the same attributes as the first unicast flow data record 310 but is associated with post NATed multicast flow.

The hybrid flow record 330, generated by an edge network node, includes a name of the OIF 242, an index of the OIF 242, and other attributes. The hybrid flow record 330 is based on obtaining a unicast media stream and is generated by: extracting, from the first unicast flow data record 310 associated with the unicast media stream, unicast information about the source and the destination, performing the network address translation for switching the traffic flow from a unicast media stream and a multicast media stream, and generating one or more hybrid flow records (i.e., the hybrid flow record 330) that include the unicast information and multicast information for transporting the multicast media stream along the path in the on-premises network. In other words, flow data record for the OIF 242 is now the hybrid flow record 330.

The network management service 260 gathers flow instrumentation including the first unicast flow data record 310, the second multicast flow data record 320, and the hybrid flow record 330 and at 340, generates the merged flow data record 300. The network management service 260 constructs first class flow objects for every OIF associated with IIF. If there is a pre-source and pre-destination fields present in the OIF (i.e., the hybrid flow record 330), then the network management service 260 further queries and merges corresponding unicast switch object (i.e., the first unicast flow data record 310 and/or the second multicast flow data record 320) into flow objects to generate the merged flow data record 300. The merged flow data record 300 allows to maintain information about the traffic flow even though the traffic flow was network address translated from unicast to multicast.

The rest of the flow objects or flow data records (intermediate network device and LHR) include source and group field that links them to the unicast flow. That is, the source and group (S, G) present in resultant flow object are present in all objects in the flow path until the LHR. Using this group, the network management service 260 traverses the shortest path and visualizes end to end path of the traffic flow, as shown in FIG. 4.

Moreover, multiple hybrid flow records may be generated (one for each multicast destination), shown at 342. Analogously, multiple merged flow data records may be generated (one for each multicast destination), shown at 344.

Figure 4:
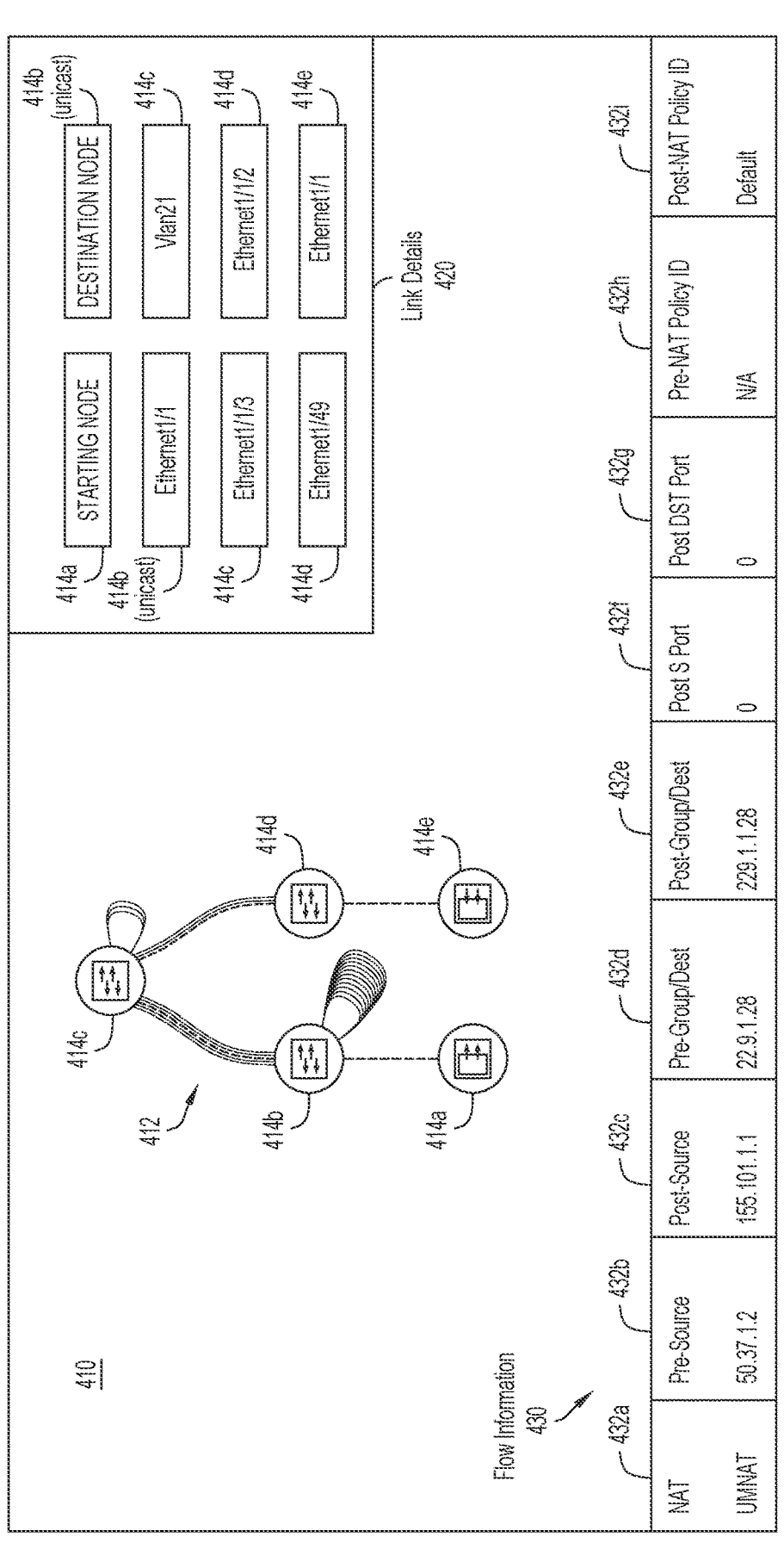
FIG. 4 is a diagram depicting a user interface that provides end-to-end visibility of a path traversed by a traffic flow that is translated from unicast to multicast, according to an example embodiment.

With continued reference to FIGS. 2 and 3, FIG. 4 is a view illustrating a user interface 400 that provides end-to-end visibility of a path traversed by a traffic flow that is translated from unicast to multicast, according to an example embodiment. The user interface 400 includes a visualization 410 of the end-to-end path traversed by the traffic flow which was network address translated from unicast to multicast when switching from a first portion of the path to a second portion of the path, link details 420, and flow information 430.

The visualization 410 visually depicts the end-to-end path 412 traversed by the traffic flow. The end-to-end path 412 includes a plurality of network nodes 414a-e traversed along the path including a source 414a, a unicast network node 414b, a first hop router 414c, a spine node 414d, and a destination 414e.

The link details 420 provide information about the links or each hop along the path and may include information such as an address of the sending node, an address of the receiving node, and a type of node for each hop along the path. For example, a special indicator may be provided to illustrate that the node is associated with unicast (IP route).

Flow information 430 includes one or more attributes of the traffic flow. Flow information may include information from the merged flow data record 300 such as an identification of the node that performed the network address translation (not shown), type of NAT being performed (NAT 432a), pre source address 432b, post source address 432c, pre-group or destination 432d, post-group or destination 432e, post source port 432f, post destination (dst) port 432g, pre-NAT policy ID 432h, post-NAT policy ID 432i, and so on.

Figure 5:
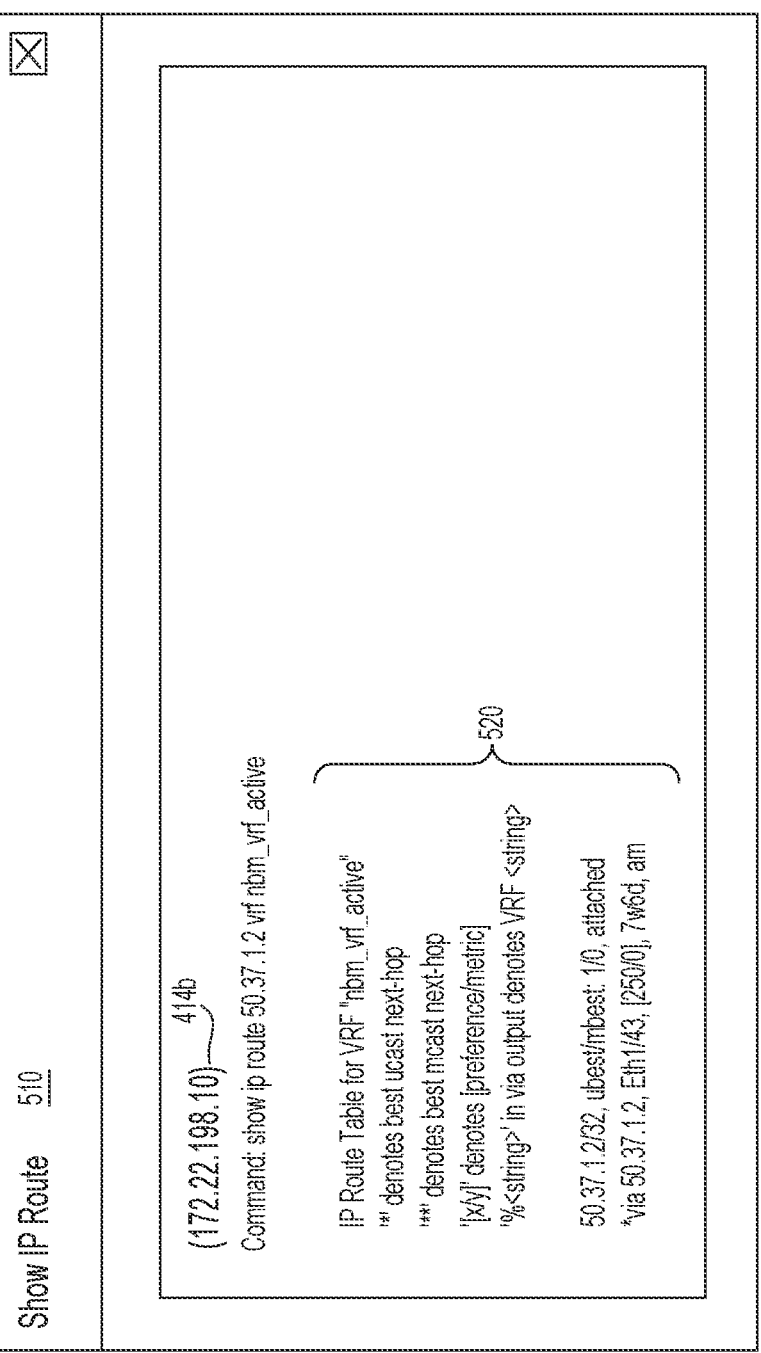
FIG. 5 is a diagram depicting a user interface that provides path information based on input, according to an example embodiment.

A user or an operator may manipulate the user interface 400 by selecting one or more nodes and obtain additional information. For example, the user may select the unicast network node 414b and obtain information related to a unicast or a first portion of the path, as shown in FIG. 5.

With continued reference to FIGS. 2-4, FIG. 5 is a view illustrating a user interface 500 that provides path information based on input, according to an example embodiment. The user interface 500 includes an IP route 510, which is a first portion of the path (unicast). Specifically, details 520 about IIF of the merged NAT flow being unicast are depicted based on unicast reachability. The details of the IIF interface of the unicast network node 414b include IP addresses of unicast network nodes, protocols, and other attributes.

Figure 6:
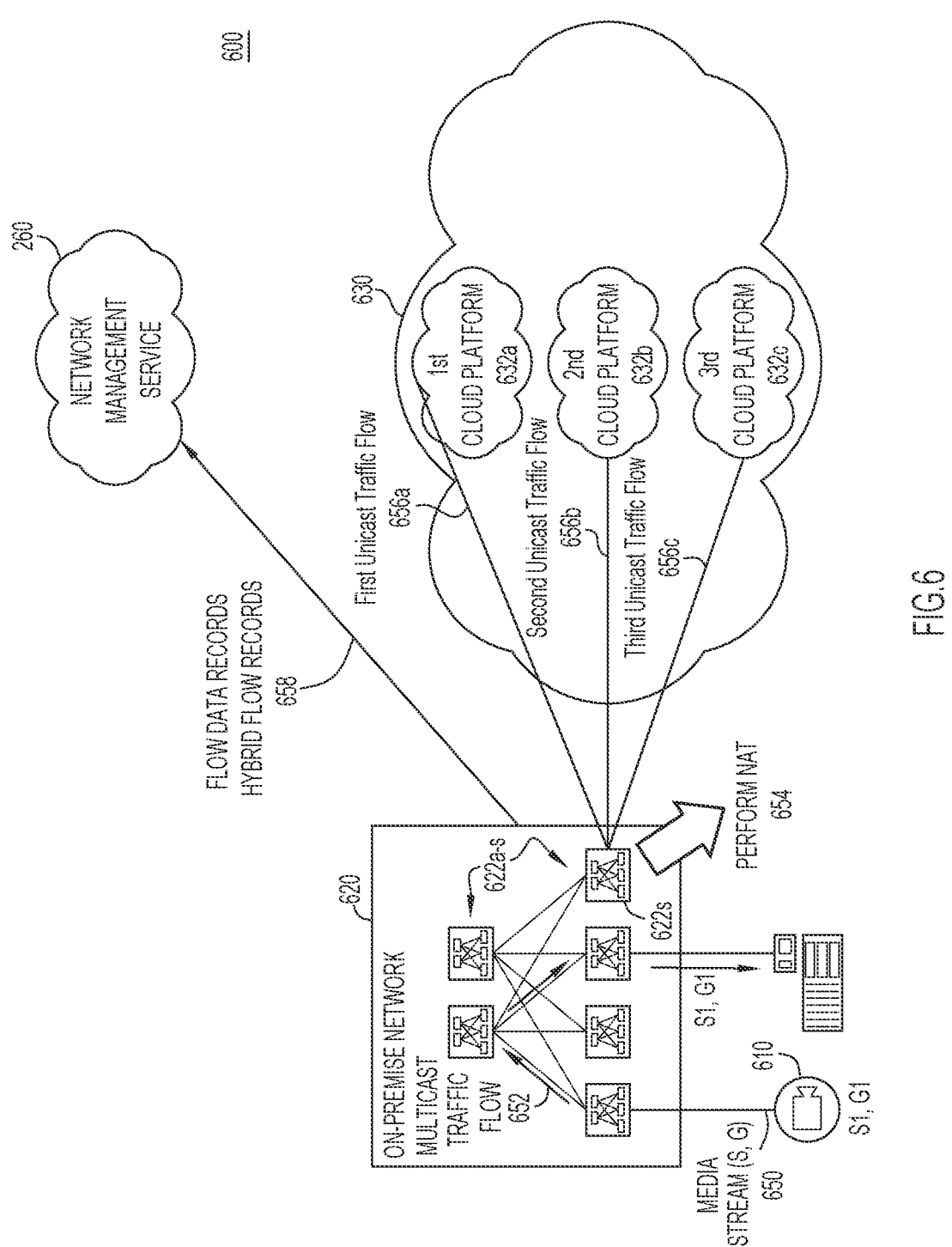
FIG. 6 is a diagram illustrating a system in which a hybrid flow record is generated for a traffic flow that is translated from multicast to unicast, according to an example embodiment.

FIG. 6 is a diagram illustrating a system 600 in which a hybrid flow record is generated for a traffic flow that is translated from multicast to unicast, according to an example embodiment. The system 600 includes a multicast source device 610, an on-premise network 620, a cloud network 630, and the network management service 260 of FIG. 2. The multicast source device 610 may be the data source device 124a of FIG. 1, the on-premise network 620 may be the first on-premise network 120a of FIG. 1, and the cloud network 630 may be the cloud network 130 of FIG. 1.

The on-premise network 620 includes a plurality of network devices 622a-s such as switches (spine, leaf, etc.), routers, etc. The plurality of network devices 622a-s include an edge device i.e., the last hop router 622s such as an egress switch. The last hop router 622s performs network address translations from multicast to unicast. The last hop router 622s may generate multiple copies of the same multicast traffic flow and stream it to different destinations in the cloud network 630 as unicast traffic by translating IP address and port. The on-premise network 230 may further include a plurality of endpoints (i.e., the multicast source device 610) such as encoders, user devices, cameras, etc.

The cloud network 630 includes a first cloud platform 632a, a second cloud platform 632b, and a third cloud platform 632c, which may be managed by different service providers.

In the system 600, content (traffic stream) is handed off to the cloud network 630 but correlation to the multicast flow is maintained. Specifically, at 650, the multicast source device 610 (e.g., a camera) generates media data stream and sends the media data stream to a network device in the on-premise network 620. The media data stream includes metadata identifying the source as S1 and a group of destinations (G1).

At 652, the media data stream is multicast traffic flow that traverses various network devices in the on-premise network 620 is eventually received by the last hop router 622s.

At 654, the last hop router 622s performs network address translation in which the multicast traffic flow is transformed into one or more unicast traffic flows. The last hop router 622s streams multiple copies of the same multicast traffic flow to the cloud network 630. Specifically, the last hop router 622s, at 656a, streams a first unicast traffic flow to the first cloud platform 632a, at 656b, streams a second unicast traffic flow to the second cloud platform 632b, and, at 656c, streams a third unicast traffic flow to the third cloud platform 632c.

To merge multicast traffic to translated unicast traffic, the last hop router 622s models post-NAT unicast flow object to include a pointer to pre-NAT source and pre-NAT group. That is, the last hop router 622s generates a hybrid flow record for an OIF that includes the source and group of the pre-NATed multicast flow. At 658, the flow data records and the hybrid flow records are provided to the network management service 260.

The network management service 260 leverages this information to look up a corresponding multicast flow and construct a merged flow, as detailed with reference to FIG. 7. The merged flow inherits multicast attributes of Pre-NAT flow and maintains post-NAT source and destination as additional attributes to render the end-to-end flow. That is, the network management service 260 generates a merged flow record that provides information for end-to-end visibility of the path traversed by the traffic flow including a first portion of the path that was traversed in the on-premise network 620 and a second portion of the path that was traversed in the cloud network 630. The end-to-end path visibility includes network devices traversed in the on-premise network 620 (multicast) and in the cloud network 630 (unicast).

Figure 7:
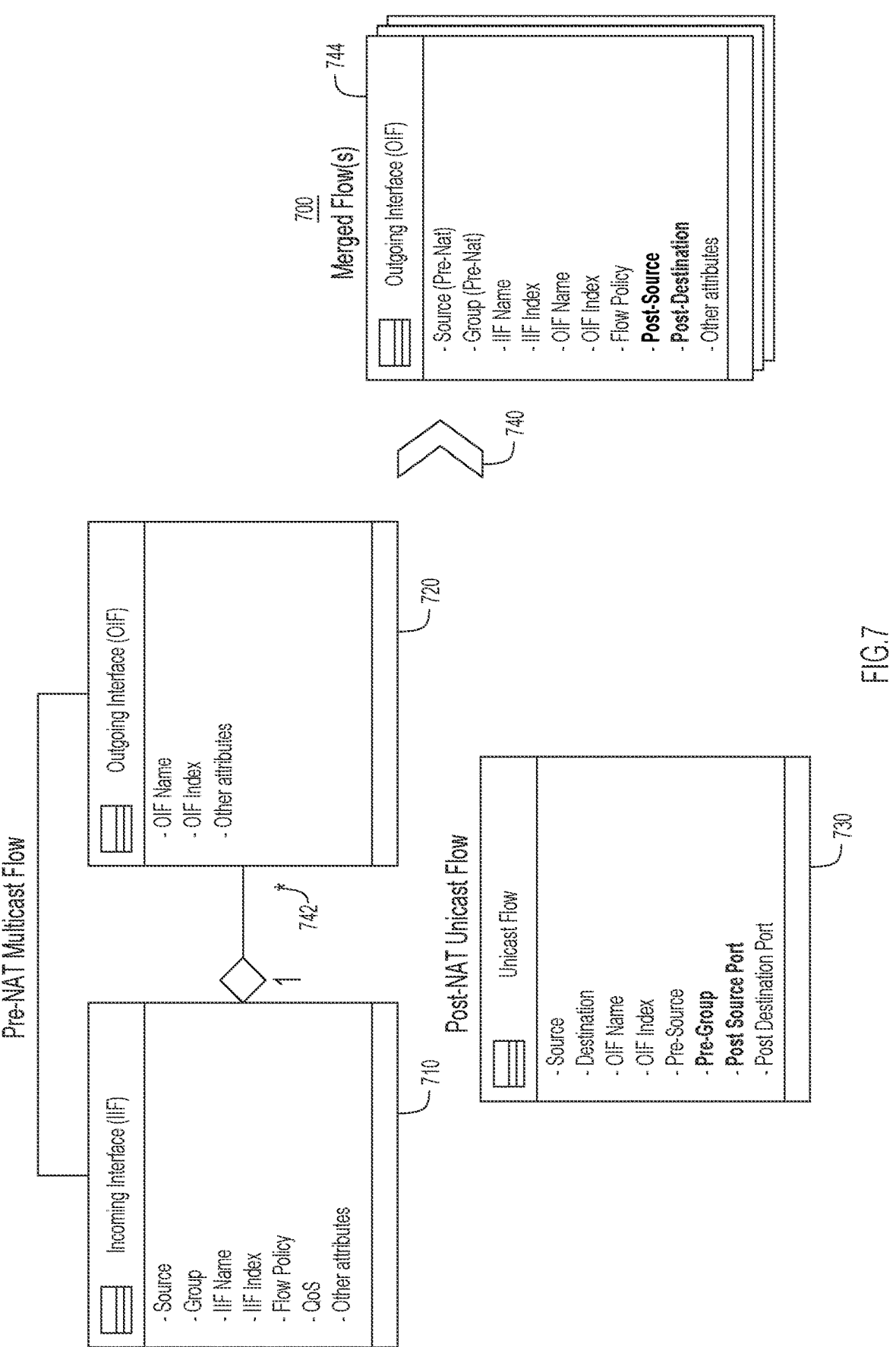
FIG. 7 is a diagram illustrating a merged flow data record for a traffic flow that is translated from multicast to unicast, according to an example embodiment.

With continued reference to FIG. 6, FIG. 7 is a diagram illustrating a merged flow record 700 for a traffic flow that is translated from multicast to unicast, according to an example embodiment. The merged flow record 700 is based on flow data records such as a first multicast flow data record 710 for IIF, a second multicast flow data record 720 for OIF and a hybrid flow record 730 for unicast flow.

The first multicast flow data record 710 is associated with multicast traffic flow and the IIF of the last hop router 622s. The first multicast flow data record 710 includes information such as source(S) and group (G), a name of the IIF, an index of the IIF, flow policy, quality of service (QoS), and other attributes. The second multicast flow data record 720 of the OIF includes OIF name, OIF index and other attributes. When translated for unicast, the hybrid flow record 730 is generated. The hybrid flow record 730 is associated with post NATed unicast flow.

The hybrid flow record 730, generated by an edge network node, includes a source and destination (post NAT), OIF name, OIF index, pre-source identifier and pre-group identifier (multicast information that identifies the source and group prior to performing network address translation). The hybrid flow record 730 further includes source port and destination port, which are unicast identifiers after performing the network address translation.

The hybrid flow record 730 is generated by the last hop router 622s obtaining a multicast media stream, extracting, from a multicast data record associated with the multicast media stream, multicast information about the source and the group, performing the network address translation for switching the traffic flow from the multicast media stream to a unicast media stream, and generating one or more hybrid flow record that include the multicast information and unicast information for transporting the unicast media stream along the path in the cloud network.

At 740, the network management service 260 leverages the hybrid flow record 730 to look up corresponding flow and construct or generate the merged flow record 700. The merged flow record 700 inherits multicast attributes of pre-NATed flow and maintains post-NAT source and destination as additional attributes to render end-to-end path visibility for the traffic flow. The merged flow record 700 includes pre-NATed source and group, name of IIF, index of IIF, name of OIF, index of OIF, flow policy, post-source, post destination and other attributes.

The merged flow record 700 allows to maintain information about the traffic flow even though the traffic flow was network address translated from multicast to unicast. The merged flow record 700 makes it possible to correlate multicast flow data record of a first hop router with unicast.

As shown at 742, multiple hybrid flow records may be generated (one for each unicast destination) and as shown at 744, multiple merged flow data records may be generated (one for each unicast destination).

Figure 8:
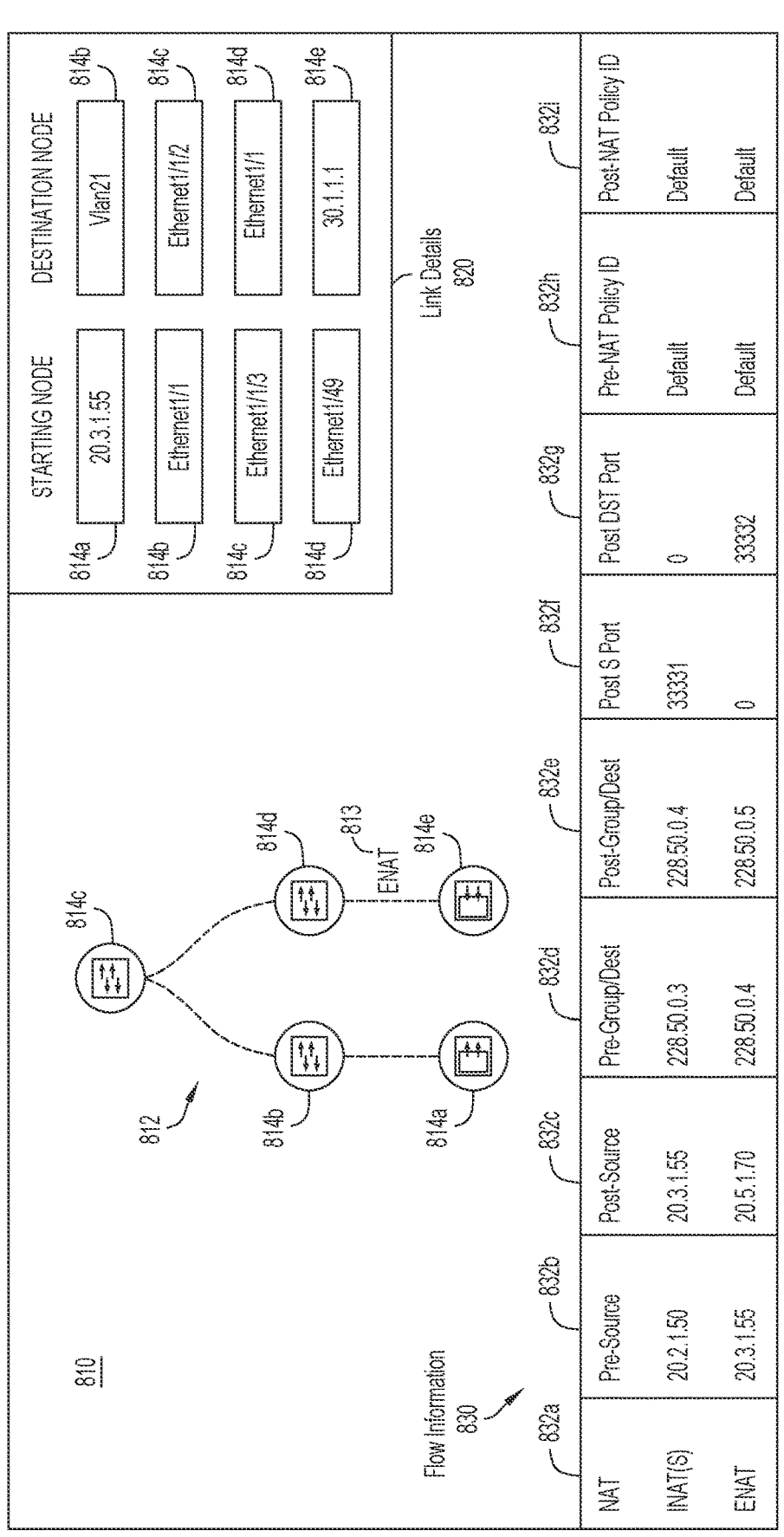
FIG. 8 is a diagram depicting another user interface that provides end-to-end visibility of a path traversed by a traffic flow that is translated from multicast to unicast, according to an example embodiment.

With continued reference to FIGS. 6 and 7, FIG. 8 is a view illustrating a user interface 800 that provides end-to-end visibility of a path traversed by a traffic flow that is translated from multicast to unicast, according to an example embodiment. The user interface 800 includes a visualization 810 of the end-to-end path traversed by the traffic flow which was network address translated from multicast to unicast when switching from a first portion of the path to a second portion of the path, link details 820, and flow information 830.

The visualization 810 visually depicts the end-to-end path 812 traversed by the traffic flow. The end-to-end path 812 includes a plurality of network nodes 814a-e including a source 814a, a first multicast leaf network node 814b, a multicast spine node 814c, a second multicast leaf node 814d that is also a last hop router or an egress switch, and a unicast destination node 814e. Additionally, a visual indicator 813 may be provided that shows that the traffic flow is network address translation (eNAT) from multicast to unicast.

The link details 820 provide information about links or each hop along the path and may include information such as an address of the sending node, an address of the receiving node, and type of node (VLAN, Ethernet, IP, etc.). For example, a special indicator may be provided to illustrate that the node is unicast, as shown with respect to the unicast destination node 814e.

Flow information 830 includes one or more attributes of the traffic flow. Flow information may include information from the merged flow record 700 of FIG. 7 such as an identification of the node that performed the network address translation (not shown), type of NAT being performed (NAT 832a), pre source address 832b, post source address 832c, pre-group or destination 832d, post-group or destination 832e, post source port 832f, post destination (dst) port 832g, pre-NAT policy ID 832h, post-NAT policy ID 832i, and so on.

As shown in the user interface 800, the merged flow record 700 of FIG. 7 makes it possible to correlate first hop router flow data records with the unicast record.

The techniques presented herein separate out multicast traffic (S, G) seen by media endpoints versus common source and group seen by switches (i.e., fabric S, G). This helps tracking multiple translations of a given flow from sender to receiver (from source to destination) and generates one unified merged flow data record for traffic visualization. The techniques presented herein also help identify inactive flows due to unavailability of the end-to-end path from sender to receiver.

Figure 9:
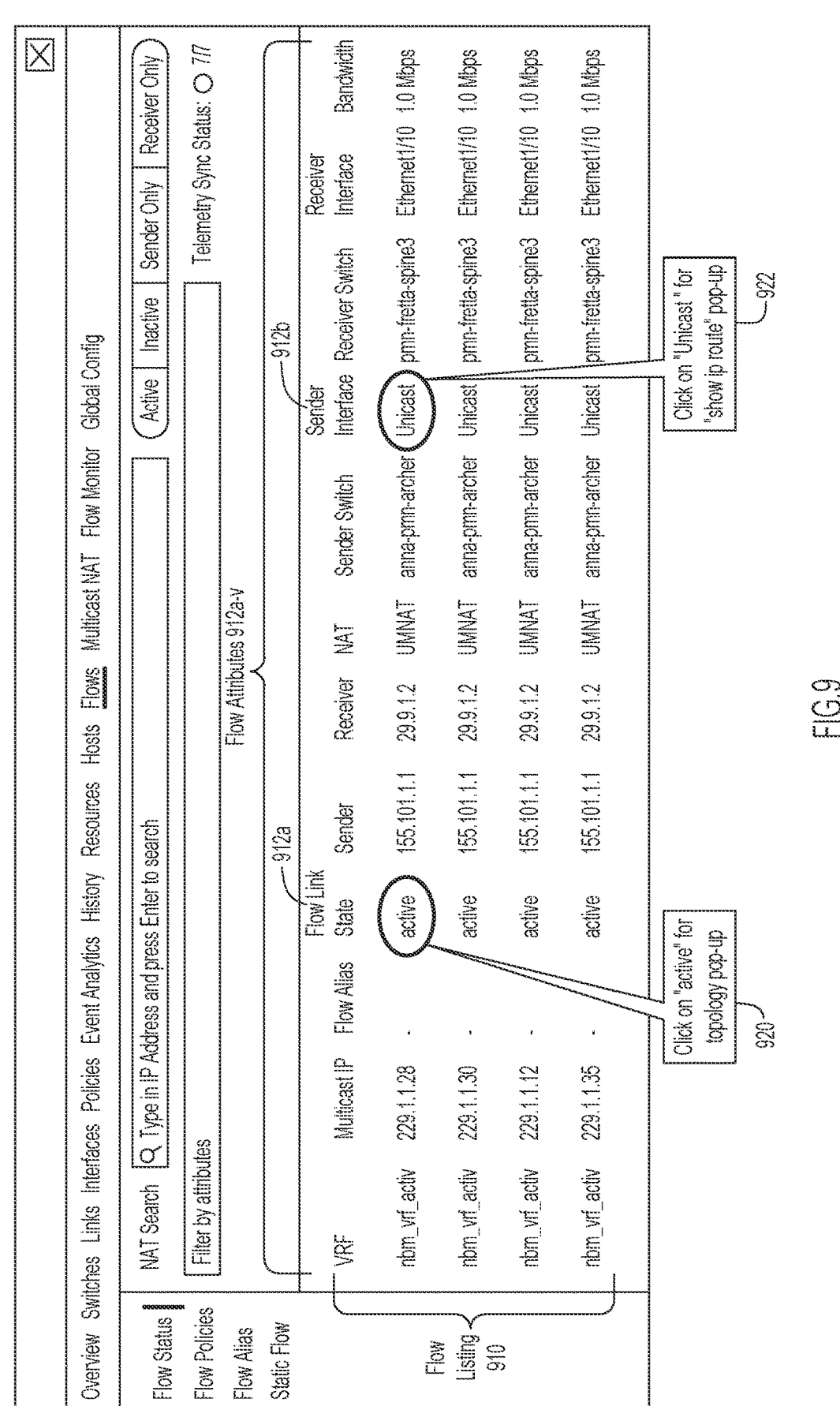
FIG. 9 is a diagram depicting yet another user interface that provides states for traffic flows, according to an example embodiment.

FIG. 9 is a view illustrating a user interface 900 that provides states for traffic flows, according to an example embodiment. States or statuses for traffic flows facilitate troubleshooting network issues.

The user interface 900 includes a flow listing 910 that lists a plurality of flows being monitored. For each flow, a plurality of attributes 912*a-v* are provided. The plurality of attributes include a flow link status 912*a* and sender interface 912*b*. The flow link status is one of active, inactive, sender only, receiver only. That is, the network management service 260 determines or classifies each traffic flow using the merged flow data records. For example, if the traffic flow arrives from the source to destination, it is classified as an active flow. On the other hand, if there is a down link along the path being traversed by the traffic flow, a faulty intermediate node, or insufficient bandwidth, the traffic flow is classified as inactive. Traffic flows that have a sender streaming media but there are no receiver nodes interested in the media, is a sender only traffic flow. Similarly, if receivers request media data but there are no sources that provide the media, the traffic flow is a receiver only traffic flow.

By classifying the traffic flows into various categories, help separate various network issues to help quickly troubleshoot, debug, and fix a network issue. Clear classification of traffic flows makes the user or network operator aware in the event receiver endpoints are waiting on streams or cameras (or any other input devices) streaming and consuming bandwidth without any interested parties. In other words, categorizing traffic flows improves and speedup troubleshooting network issues and improves use of network resources.

By selecting a particular flow, at 920, the topology information for the flow is obtained such as the user interface 400 of FIG. 4 or the user interface 800 of FIG. 8. By selecting a sender interface for a particular traffic flow, at 922, a unicast route or an IP route is obtained, as shown in the user interface 500 of FIG. 5.

The techniques presented herein visualize hybrid traffic flows of NATed environment. That is, the techniques presented herein trace or track an end-to-end path traversed by a traffic flow that was translated between unicast and multicast, based on merged flow data records.

For example, a merged flow data record is generated by merging the source and the group of the multicast information with at least a unicast source and a unicast destination of the unicast information for determining the end-to-end visibility of the path for the traffic flow. As another example, a merged flow data record is generated by separating the source and the group of the multicast information, obtained from a source endpoint, and a fabric source and a fabric group, observed by one or more network nodes along the path, to track a plurality of network address translations and by adding the fabric source and the fabric group to the merged flow data record.

The techniques further determine states of the traffic flows based on the end-to-end visibility of the paths traversed by the traffic flows. The states of the traffic flows include active traffic flows, inactive traffic flows, sender only traffic flows, and receiver only traffic flows. Traffic categorization is useful to debug traffic in hybrid setup between cloud and on-premises setup and to perform the needed remediations actions. For example, the remediation actions may involve stopping the streaming of sender only traffic flows, allocating more bandwidth for inactive flows, selecting sources for receiver only traffic flows.

FIG. 10 is a flowchart illustrating a method 1000 of providing end-to-end visibility of a path traversed by a traffic flow that was network address translated between unicast and multicast, according to an example embodiment. The method 1000 may be performed by a computing device such as a server or a group of servers that execute the techniques of FIGS. 1-9. In one example embodiment, the method 1000 may be performed by the controller 110 of FIG. 1 or the network management service 260 of FIGS. 2 and 6.

The method 1000 involves, at 1002, obtaining at least one hybrid flow record that includes information about a source of a traffic flow prior to performing a network address translation for the traffic flow. The traffic flow traverses from the source, along a path in a network, to a destination.

The method 1000 further involves at 1004, generating a merged flow data record in which at least two flow data records are merged based on the at least one hybrid flow record. The at least two flow data records include a unicast flow data record and a multicast flow data record based on the traffic flow traversing along the path in the network.

The method 1000 involves at 1006, providing an end-to-end visibility of the path traversed by the traffic flow based on the merged flow data record.

According to one or more example embodiments, the traffic flow may include media data. The method 1000 may further include generating a respective flow data record at each network node along the path. At least a first portion of the path may be in an on-premises network and at least a second portion of the path may be in a cloud network. The method 1000 may further include performing the network address translation for switching the traffic flow between a unicast media stream and a multicast media stream based on the traffic flow traversing between the first portion of the path and the second portion of the path.

In one instance, the at least one hybrid flow record may be generated at an edge network node in which the network address translation of the traffic flow is performed.

In one form, the operation 1002 of obtaining the at least one hybrid flow record may be based on obtaining, via a cloud network, by a first hop node of an on-premises network, a unicast media stream and extracting, from a unicast data record associated with the unicast media stream, unicast information about the source and the destination. The operation 1002 of obtaining the at least one hybrid flow record may further be based on performing the network address translation for switching the traffic flow from a unicast media stream and a multicast media stream and generating the at least one hybrid flow record that includes the unicast information and multicast information for transporting the multicast media stream along the path in the on-premises network.

In another form, the operation 1002 of obtaining the at least one hybrid flow record may be based on obtaining, by a last hop node of an on-premises network, a multicast media stream and extracting, from a multicast data record associated with the multicast media stream, multicast information about the source and a group. The operation 1002 of obtaining the at least one hybrid flow record may further be based on performing the network address translation for switching the traffic flow from the multicast media stream to a unicast media stream and generating the at least one hybrid flow record that includes the multicast information and unicast information for transporting the unicast media stream along the path in a cloud network.

According to one or more example embodiments, the operation 1004 of generating the merged flow data record may include merging the source and the group of the multicast information with at least a unicast source and a unicast destination of the unicast information for determining the end-to-end visibility of the path for the traffic flow.

In one instance, the operation 1004 of generating the merged flow data record may include separating the source and the group of the multicast information, obtained from a source endpoint, and a fabric source and a fabric group, observed by one or more network nodes along the path, to track a plurality of network address translations and adding the fabric source and the fabric group to the merged flow data record.

In another instance, the method 1000 may further include determining a state of the traffic flow from a plurality of traffic states based on the end-to-end visibility of the path traversed by the traffic flow, wherein the plurality of traffic states include an active traffic flow, an inactive traffic flow, a sender only traffic flow, and a receiver only traffic flow and providing the state of the traffic flow for troubleshooting.

Figure 11:
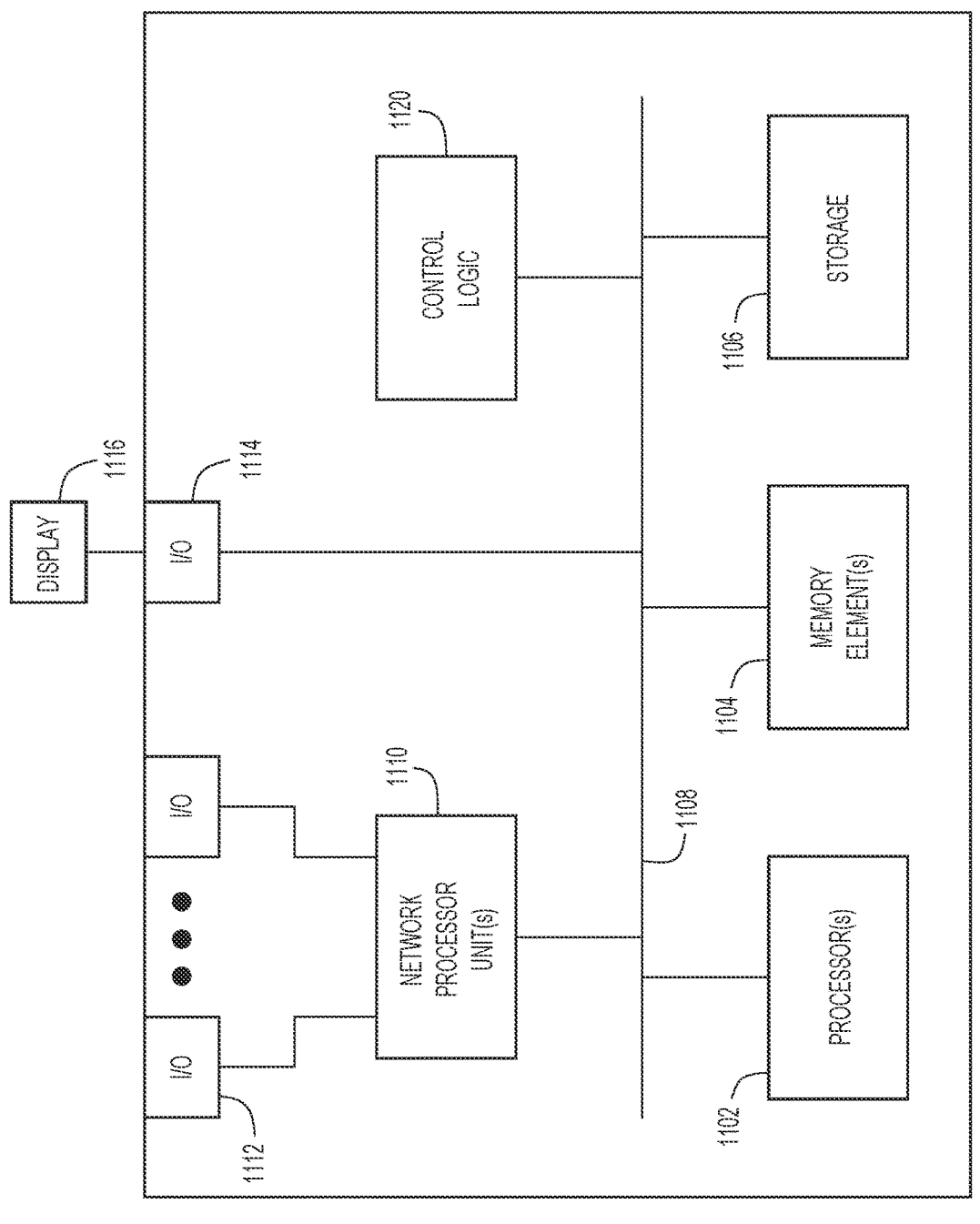
FIG. 11 is a hardware block diagram of a computing device that may perform functions associated with any combination of operations in connection with the techniques depicted and described in FIGS. 1-10, according to various example embodiments.

FIG. 11 is a hardware block diagram of a computing device 1100 that may perform functions associated with any combination of operations in connection with the techniques depicted in FIGS. 1-10, according to various example embodiments, including, but not limited to, operations of the computing device or one or more servers that execute the controller 110 of FIG. 1, one of the network/computing equipment and software 122*a-k* of FIG. 1, one of the endpoints 124*a-j* of FIG. 1, the unicast source device 210, one of the network nodes 232*a-p* of FIG. 2, one of the endpoints 234*a-q* of FIG. 2, the network management service 260 of FIGS. 2 and 6, the multicast source device 610 of FIG. 6, one of the network nodes 622*a-s* of FIG. 6, and one of the cloud platforms of FIGS. 1 and 6. The computing device 1100 may be representative of one of the network devices, network/computing equipment, or a hardware asset. It should be appreciated that FIG. 11 provides only an illustration of one example embodiment and does not imply any limitations with respect to the environments in which different example embodiments may be implemented. Many modifications to the depicted environment may be made.

In at least one embodiment, computing device 1100 may include one or more processor(s) 1102, one or more memory element(s) 1104, storage 1106, a bus 1108, one or more network processor unit(s) 1110 interconnected with one or more network input/output (I/O) interface(s) 1112, one or more I/O interface(s) 1114, and control logic 1120. In various embodiments, instructions associated with logic for computing device 1100 can overlap in any manner and are not limited to the specific allocation of instructions and/or operations described herein.

In at least one embodiment, processor(s) 1102 is/are at least one hardware processor configured to execute various tasks, operations and/or functions for computing device 1100 as described herein according to software and/or instructions configured for computing device 1100. Processor(s) 1102 (e.g., a hardware processor) can execute any type of instructions associated with data to achieve the operations detailed herein. In one example, processor(s) 1102 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, one or more memory element(s) 1104 and/or storage 1106 is/are configured to store data, information, software, and/or instructions associated with computing device 1100, and/or logic configured for memory element(s) 1104 and/or storage 1106. For example, any logic described herein (e.g., control logic 1120) can, in various embodiments, be stored for computing device 1100 using any combination of memory element(s) 1104 and/or storage 1106. Note that in some embodiments, storage 1106 can be consolidated with one or more memory elements 1104 (or vice versa), or can overlap/exist in any other suitable manner.

In at least one embodiment, bus 1108 can be configured as an interface that enables one or more elements of computing device 1100 to communicate in order to exchange information and/or data. Bus 1108 can be implemented with any architecture designed for passing control, data and/or information between processors, memory elements/storage, peripheral devices, and/or any other hardware and/or software components that may be configured for computing device 1100. In at least one embodiment, bus 1108 may be implemented as a fast kernel-hosted interconnect, potentially using shared memory between processes (e.g., logic), which can enable efficient communication paths between the processes.

In various embodiments, network processor unit(s) 1110 may enable communication between computing device 1100 and other systems, entities, etc., via network I/O interface(s) 1112 to facilitate operations discussed for various embodiments described herein. In various embodiments, network processor unit(s) 1110 can be configured as a combination of hardware and/or software, such as one or more Ethernet driver(s) and/or controller(s) or interface cards, Fibre Channel (e.g., optical) driver(s) and/or controller(s), and/or other similar network interface driver(s) and/or controller(s) now known or hereafter developed to enable communications between computing device 1100 and other systems, entities, etc. to facilitate operations for various embodiments described herein. In various embodiments, network I/O interface(s) 1112 can be configured as one or more Ethernet port(s), Fibre Channel ports, and/or any other I/O port(s) now known or hereafter developed. Thus, the network processor unit(s) 1110 and/or network I/O interface(s) 1112 may include suitable interfaces for receiving, transmitting, and/or otherwise communicating data and/or information in a network environment.

I/O interface(s) 1114 allow for input and output of data and/or information with other entities that may be connected to computing device 1100. For example, I/O interface(s) 1114 may provide a connection to external devices such as a keyboard, keypad, a touch screen, and/or any other suitable input device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a display 1116 such as a computer monitor, a display screen, or the like.

In various embodiments, control logic 1120 can include instructions that, when executed, cause processor(s) 1102 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

In another example embodiment, an apparatus is provided. The apparatus includes a memory, a network interface configured to enable network communications, and a processor. The processor is configured to perform a method including obtaining at least one hybrid flow record that includes information about a source of a traffic flow prior to performing a network address translation for the traffic flow. The traffic flow traverses from the source, along a path in a network, to a destination. The method further includes generating a merged flow data record in which at least two flow data records are merged based on the at least one hybrid flow record. The at least two flow data records include a unicast flow data record and a multicast flow data record based on the traffic flow traversing along the path in the network. The method further includes providing an end-to-end visibility of the path traversed by the traffic flow based on the merged flow data record.

In yet another example embodiment, one or more non-transitory computer readable storage media encoded with instructions are provided. When the media is executed by a processor, the instructions cause the processor to execute a method that includes obtaining at least one hybrid flow record that includes information about a source of a traffic flow prior to performing a network address translation for the traffic flow. The traffic flow traverses from the source, along a path in a network, to a destination. The method further involves generating a merged flow data record in which at least two flow data records are merged based on the at least one hybrid flow record. The at least two flow data records include a unicast flow data record and a multicast flow data record based on the traffic flow traversing along the path in the network. The method further involves providing an end-to-end visibility of the path traversed by the traffic flow based on the merged flow data record.

In yet another example embodiment, a system is provided that includes the devices and operations explained above with reference to FIGS. 1-11.

The programs described herein (e.g., control logic 1120) may be identified based upon the application(s) for which they are implemented in a specific embodiment. However, it should be appreciated that any particular program nomenclature herein is used merely for convenience, and thus the embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, the storage 1106 and/or memory elements(s) 1104 can store data, software, code, instructions (e.g., processor instructions), logic, parameters, combinations thereof, and/or the like used for operations described herein. This includes the storage 1106 and/or memory elements(s) 1104 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio- Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

Communications in a network environment can be referred to herein as 'messages', 'messaging', 'signaling', 'data', 'content', 'objects', 'requests', 'queries', 'responses', 'replies', etc. which may be inclusive of packets. As referred to herein, the terms may be used in a generic sense to include packets, frames, segments, datagrams, and/or any other generic units that may be used to transmit communications in a network environment. Generally, the terms reference to a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data, or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

Each example embodiment disclosed herein has been included to present one or more different features. However, all disclosed example embodiments are designed to work together as part of a single larger system or method. This disclosure explicitly envisions compound embodiments that combine multiple previously discussed features in different example embodiments into a single system or method.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method comprising:

obtaining at least one hybrid flow record that includes information about a source of a traffic flow prior to performing a network address translation for the traffic flow in which the traffic flow is switched from a multicast media stream to a unicast media stream or from the unicast media stream to the multicast media stream, wherein the traffic flow traverses from the source, along a path in a network, to a destination, and wherein the at least one hybrid flow record includes a post network address translation source for the traffic flow;

generating a merged flow data record in which at least two flow data records are merged based on the at least one hybrid flow record, wherein the at least two flow data records include a unicast flow data record and a multicast flow data record based on the traffic flow traversing along the path in the network; and providing an end-to-end visibility of the path traversed by the traffic flow based on the merged flow data record.

2. The method of claim 1, wherein the traffic flow includes media data, and further comprising:

generating a respective flow data record at each network node along the path, wherein at least a first portion of the path is in an on-premises network and at least a second portion of the path is in a cloud network; and performing the network address translation for switching the traffic flow between the unicast media stream and the multicast media stream based on the traffic flow traversing between the first portion of the path and the second portion of the path.

3. The method of claim 1, wherein the at least one hybrid flow record is generated at an edge network node in which the network address translation of the traffic flow is performed.

4. The method of claim 1, wherein obtaining the at least one hybrid flow record is based on:

obtaining, via a cloud network, by a first hop node of an on-premises network, the unicast media stream, extracting, from a unicast data record associated with the unicast media stream, unicast information about the source and the destination, performing the network address translation for switching the traffic flow from the unicast media stream to the multicast media stream, and generating the at least one hybrid flow record that includes the unicast information and multicast information for transporting the multicast media stream along the path in the on-premises network.

5. The method of claim 1, wherein obtaining the at least one hybrid flow record is based on:

obtaining, by a last hop node of an on-premises network, the multicast media stream, extracting, from a multicast data record associated with the multicast media stream, multicast information about the source and a group, performing the network address translation for switching the traffic flow from the multicast media stream to the unicast media stream, and generating the at least one hybrid flow record that includes the multicast information and unicast information for transporting the unicast media stream along the path in a cloud network.

6. The method of claim 5, wherein generating the merged flow data record includes:

merging the source and the group of the multicast information with at least a unicast source and a unicast destination of the unicast information for determining the end-to-end visibility of the path for the traffic flow.

7. The method of claim 5, wherein generating the merged flow data record includes:

separating the source and the group of the multicast information, obtained from a source endpoint, and a fabric source and a fabric group, observed by one or more network nodes along the path, to track a plurality of network address translations; and adding the fabric source and the fabric group to the merged flow data record.

8. The method of claim 1, further comprising:

determining a state of the traffic flow from a plurality of traffic states based on the end-to-end visibility of the path traversed by the traffic flow, wherein the plurality of traffic states include an active traffic flow, an inactive traffic flow, a sender only traffic flow, and a receiver only traffic flow; and providing the state of the traffic flow for troubleshooting.

9. The method of claim 1, wherein obtaining the at least one hybrid flow record is based on:

performing the network address translation for switching the traffic flow from the unicast media stream to the multicast media stream and generating the at least one hybrid flow record that includes unicast information and multicast information for transporting the multicast media stream along the path, or performing the network address translation for switching the traffic flow from the multicast media stream to the unicast media stream and generating the at least one hybrid flow record that includes the multicast information and the unicast information for transporting the unicast media stream along the path.

10. An apparatus comprising:

a memory;

a network interface configured to enable network communications; and a processor, wherein the processor is configured to perform a method comprising:

obtaining at least one hybrid flow record that includes information about a source of a traffic flow prior to performing a network address translation for the traffic flow in which the traffic flow is switched from a multicast media stream to a unicast media stream or from the unicast media stream to the multicast media stream, wherein the traffic flow traverses from the source, along a path in a network, to a destination and wherein the at least one hybrid flow record includes a post network address translation source for the traffic flow;

generating a merged flow data record in which at least two flow data records are merged based on the at least one hybrid flow record, wherein the at least two flow data records include a unicast flow data record and a multicast flow data record based on the traffic flow traversing along the path in the network; and providing an end-to-end visibility of the path traversed by the traffic flow based on the merged flow data record.

11. The apparatus of claim 10, wherein the traffic flow includes media data, and the processor is further configured to perform:

generating a respective flow data record at each network node along the path, wherein at least a first portion of the path is in an on-premises network and at least a second portion of the path is in a cloud network; and performing the network address translation for switching the traffic flow between the unicast media stream and the multicast media stream based on the traffic flow traversing between the first portion of the path and the second portion of the path.

12. The apparatus of claim 10, wherein the at least one hybrid flow record is generated at an edge network node in which the network address translation of the traffic flow is performed.

13. The apparatus of claim 10, wherein the processor is configured to obtain the at least one hybrid flow record based on:

obtaining, via a cloud network, by a first hop node of an on-premises network, the unicast media stream, extracting, from a unicast data record associated with the unicast media stream, unicast information about the source and the destination, performing the network address translation for switching the traffic flow from the unicast media stream to the multicast media stream, and generating the at least one hybrid flow record that includes the unicast information and multicast information for transporting the multicast media stream along the path in the on-premises network.

14. The apparatus of claim 10, wherein the processor is configured to obtain the at least one hybrid flow record based on:

obtaining, by a last hop node of an on-premises network, the multicast media stream, extracting, from a multicast data record associated with the multicast media stream, multicast information about the source and a group, performing the network address translation for switching the traffic flow from the multicast media stream to the unicast media stream, and generating the at least one hybrid flow record that includes the multicast information and unicast information for transporting the unicast media stream along the path in a cloud network.

15. The apparatus of claim 14, wherein the processor is configured to generate the merged flow data record by:

merging the source and the group of the multicast information with at least a unicast source and a unicast destination of the unicast information for determining the end-to-end visibility of the path for the traffic flow.

16. The apparatus of claim 14, wherein the processor is configured to generate the merged flow data record by:

separating the source and the group of the multicast information, obtained from a source endpoint, and a fabric source and a fabric group, observed by one or more network nodes along the path, to track a plurality of network address translations; and adding the fabric source and the fabric group to the merged flow data record.

17. The apparatus of claim 10, wherein the processor is further configured to perform:

determining a state of the traffic flow from a plurality of traffic states based on the end-to-end visibility of the path traversed by the traffic flow, wherein the plurality of traffic states include an active traffic flow, an inactive traffic flow, a sender only traffic flow, and a receiver only traffic flow; and providing the state of the traffic flow for troubleshooting.

18. One or more non-transitory computer readable storage media encoded with software comprising computer executable instructions that, when executed by a processor, cause the processor to perform a method including:

obtaining at least one hybrid flow record that includes information about a source of a traffic flow prior to performing a network address translation for the traffic flow in which the traffic flow is switched from a multicast media stream to a unicast media stream or from the unicast media stream to the multicast media stream, wherein the traffic flow traverses from the source, along a path in a network, to a destination and wherein the at least one hybrid flow record includes a post network address translation source for the traffic flow;

generating a merged flow data record in which at least two flow data records are merged based on the at least one hybrid flow record, wherein the at least two flow data records include a unicast flow data record and a multicast flow data record based on the traffic flow traversing along the path in the network; and providing an end-to-end visibility of the path traversed by the traffic flow based on the merged flow data record.

19. The one or more non-transitory computer readable storage media according to claim 17, wherein the traffic flow includes media data, and wherein the computer executable instructions cause the processor to further perform:

generating a respective flow data record at each network node along the path, wherein at least a first portion of the path is in an on-premises network and at least a second portion of the path is in a cloud network; and performing the network address translation for switching the traffic flow between the unicast media stream and the multicast media stream based on the traffic flow traversing between the first portion of the path and the second portion of the path.

20. The one or more non-transitory computer readable storage media according to claim 18, wherein the computer executable instructions cause the processor to obtain the at least one hybrid flow record based on:

obtaining, via a cloud network, by a first hop node of an on-premises network, the unicast media stream, extracting, from a unicast data record associated with the unicast media stream, unicast information about the source and the destination, performing the network address translation for switching the traffic flow from the unicast media stream to the multicast media stream, and generating the at least one hybrid flow record that includes the unicast information and multicast information for transporting the multicast media stream along the path in the on-premises network.

* * * * *